(12) United States Patent
Isaki et al.

(10) Patent No.: US 6,206,026 B1
(45) Date of Patent: Mar. 27, 2001

(54) VALVE FOR LP GAS CYLINDER

(75) Inventors: Ryuichiro Isaki; Takuya Ikeda; Satoshi Hasaka; Hideharu Hasegawa, all of Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/509,346
(22) PCT Filed: Jul. 27, 1999
(86) PCT No.: PCT/JP99/04004
  § 371 Date: Mar. 27, 2000
  § 102(e) Date: Mar. 27, 2000
(87) PCT Pub. No.: WO00/06929
  PCT Pub. Date: Feb. 10, 2000

(30) Foreign Application Priority Data

Jul. 29, 1998 (JP) .................................................. 10-214313

(51) Int. Cl.[7] .................................................... F16K 11/00
(52) U.S. Cl. ............................................. 137/240; 222/148
(58) Field of Search .................................. 222/148, 559; 137/240, 625.33

(56) References Cited

U.S. PATENT DOCUMENTS 5,232,019 * 8/1993 Wolff et al. ...................... 137/614.2
5,738,145 * 4/1998 Daicho et al. ...................... 137/878

FOREIGN PATENT DOCUMENTS

| 3-93662 | 9/1991 | (JP) . |
| 5-106749 | 4/1993 | (JP) . |
| 5-50249 | 7/1994 | (JP) . |
| 6-281026 | 10/1994 | (JP) . |
| 8-5000 | 1/1996 | (JP) . |

* cited by examiner

Primary Examiner—John Fox
(74) Attorney, Agent, or Firm—Armstrong, Westerman Hattori, McLeland & Naughton, L.L.P.

(57) ABSTRACT

A valve for a gas cylinder consisting essentially of a valve body provided with a valve chamber containing a valving element which opens and closes an annular valve seat, and a gas cylinder plugging end portion and a pipe-connecting port both formed on the valve body. The gas cylinder plugging end portion contains an upstream side gas channel communicating at one extremity to an end thereof and at the other extremity to an internal circumference of the valve seat. The port contains two downstream side gas channels each opening to an end thereof and at the other extremity to an external circumference of the valve seat. A metal connector can be fitted in the port. The metal connector contains two channels connected to the two downstream side gas channels respectively. Valve chamber openings of the downstream side gas channels are located to oppose each other across the valve seat.

3 Claims, 5 Drawing Sheets

VALVE FOR LP GAS CYLINDER

TECHNICAL FIELD

The present invention relates to a valve for a gas cylinder (gas cylinder valve), more specifically to a gas cylinder valve having a structure suitable for a gas cylinder supplying a high-purity gas such as semiconductor material gases, purge gases and carrier gases, employed in the process for manufacturing electronic devices in semiconductor industries.

BACKGROUND ART

High purity and cleanness is required in those semiconductor material gases, purge gases, carrier gases, etc. which are employed in the semiconductor manufacturing process. Presence of contaminant such as particles, oxygen and moisture if any in these gases causes problems such as insufficient device characteristics attributed to oxidation or metal pollution and reduction in the yield of products.

Generally, when a gas cylinder valve is set to a plant for supplying or producing a semiconductor process gas, the atmospheric air migrates between a mouth ring (or port) of the valve and a pipe for fitting to such a plant, since the port of the gas cylinder valve is exposed to the atmospheric air. The thus migrated atmospheric air is removed by purging with an inert gas such as a nitrogen gas and an argon gas or by evacuation. However, if the migrated contaminant is removed insufficiently, residual contaminant migrates into the gas cylinder during manufacture of a gas. For example, in the case of a gas having reactivity with the atmospheric component gases such as oxygen and water, these gases are causative of change in the concentration of the product gas with time, oxidation reactions to form impurity products and corrosion on the metal surfaces of the gas cylinder and the gas cylinder valve to be brought into contact with the gas.

Further, in supplying a gas, contamination with the residual impurity contents occurs from the gas supply plant to a gas consuming plant. The influence of contamination during the supply of the gas appears not only in the gas system but also as reduction in the yield of products and deterioration in the electric characteristics.

Gas cylinder valves employed conventionally most frequently are of the single-ported structure in which one port serves both as a gas outlet port and a gas inlet port, and the valves contain dead spaces, so that it takes much time for removing the atmospheric air components migrated into the gas cylinder valves when they are attached to gas cylinders.

Meanwhile, gas cylinder valves are proposed as described in Japanese Unexamined Patent Publication Nos. 106749/1993 and 281026/1994 so as to overcome the above problem. Although these valves can remove contaminant contained therein quickly, they involve problems in terms of safety in that the valves themselves have very large dimensions due to the block valve structure having two gas cylinder valves integrated into one block causing gas cylinders having such valves to tumble easily during transportation. These gas cylinder valves involve further problems in that the cost increases on a wide margin due to their intricate structures compared with the ordinary cylinder valves and that an extra piping for a purge gas must be provided for the gas plant side. While there is also known a gas cylinder valve incorporated with a purge valve, this gas cylinder valve has an intricate valve structure and a relatively large size and is also expensive.

DISCLOSURE OF THE INVENTION

It is an objective of the present invention to provide a gas cylinder valve which can remove particles and atmospheric air components migrated thereto quickly and efficiently when a pipe for connecting to a gas plant is connected to the valve, causes no reduction in the conductance at the time of evacuation, has a simple structure capable of achieving downsizing, and can be manufactured inexpensively.

The gas cylinder valve according to the present invention is provided with a valve body having a valve chamber containing a valving element which opens and closes an annular valve seat, and a gas cylinder plugging end portion and a pipe-connecting port both formed on the valve body; wherein the gas cylinder plugging end portion contains an upstream side gas channel opening at one extremity to an end thereof and at the other extremity to an internal circumference of the valve seat; the port contains two downstream side gas channels each opening at one extremity to an end thereof and at the other extremity to an external circumference of the valve seat; a metal connector containing two channels to be connected to the two downstream side gas channels respectively is fitted in the port; one of two channels is connected to a purge gas charge side, while the other channel is connected to a purge gas bleed side.

Meanwhile, valve chamber openings of the two downstream side gas channels are positioned to be spaced farthest from each other in the valve chamber. Further, the valve chamber is formed concentrically with respect to a valve chamber opening of the upstream side gas channel so as to surround the valve seat, while the valve chamber openings of the two downstream side gas channels are located to oppose each other across the valve seat.

The gas cylinder valve according to the present invention can give sufficient purge characteristics in spite of its simple structure. Besides, the gas cylinder valve of the present invention is the same as the conventional single-ported gas cylinder valve in terms of shape and can be manufactured in the same manner, so that it can be attached readily to the existing gas manufacture plants and gas supply plants.

BEST MODE FOR CARRYING OUT THE INVENTION

Figure 1:
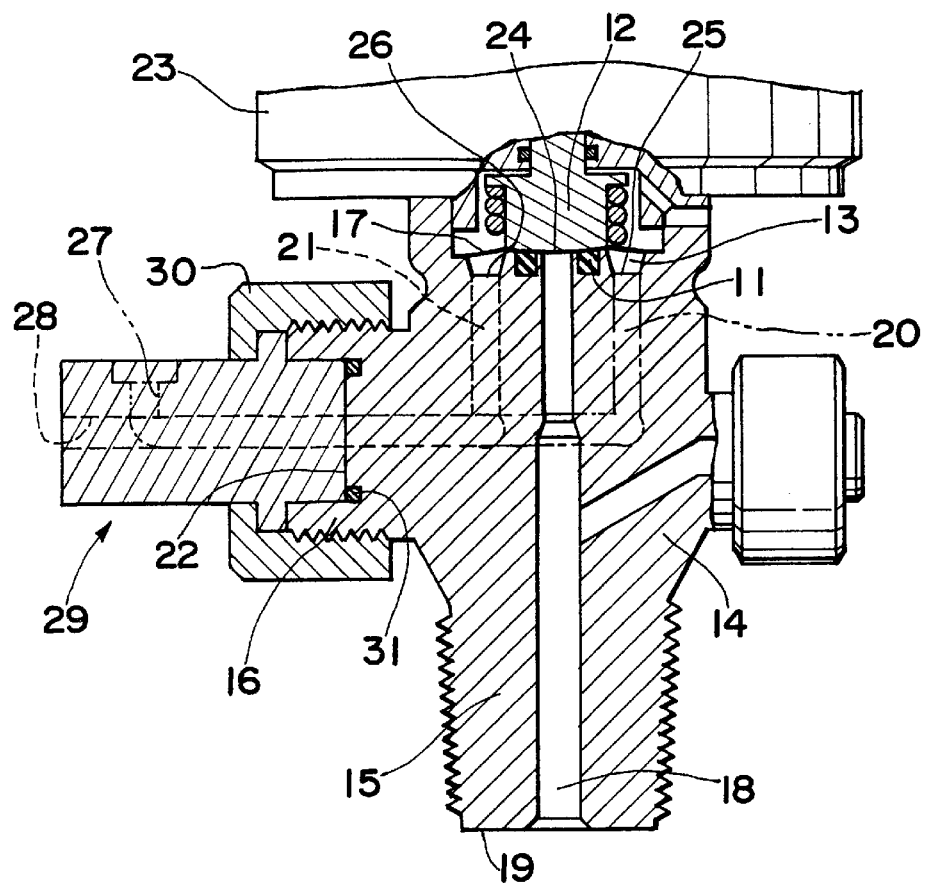
FIG. 1 is a cross-sectional front view showing relevant parts of a gas cylinder valve according to one embodiment of the present invention.

A gas cylinder valve according to one embodiment of the present invention will be described referring to FIGS. 1 to 4.

The gas cylinder valve 10 has a valve body 14 provided with a valve chamber 13 containing a valving element 12 which opens and closes an annular valve seat 11, and a gas cylinder plugging end portion 15 and a pipe-connecting port 16 both formed on the valve body 14. The valving element 12 has a diaphragm 17 disposed to traverse the valve chamber 13. The gas cylinder plugging end portion 15 has an upstream side gas channel 18 formed along the axis thereof. The channel 18 opens at one extremity to an end of the gas cylinder plugging end portion 15 and at the other extremity to the inner circumference of the valve seat 11. The pipe-connecting port 16 contains two downstream side gas channels 20 and 21 formed along the axis thereof. Each of these two gas channels 20 and 21 opens at one extremity to an end 22 of the port 16 and at the other extremity to the outer circumference of the valve seat 11. The axis of the gas cylinder plugging end portion 15 and that of the port 16 intersect with each other in the valve body 14. The gas cylinder valve 10 has at the top an opening and closing mechanism 23 for operating the valving element 12.

Figure 2:
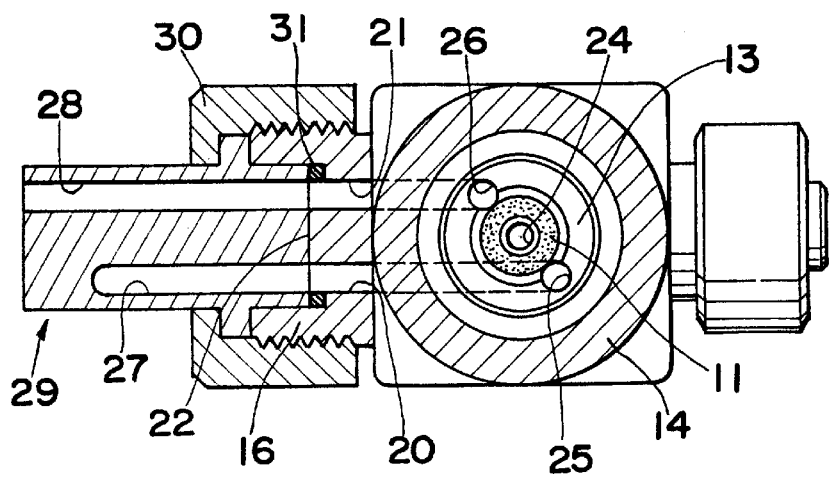
FIG. 2 is a cross-sectional view taken along the line II—II in FIG. 1.
Figure 3:
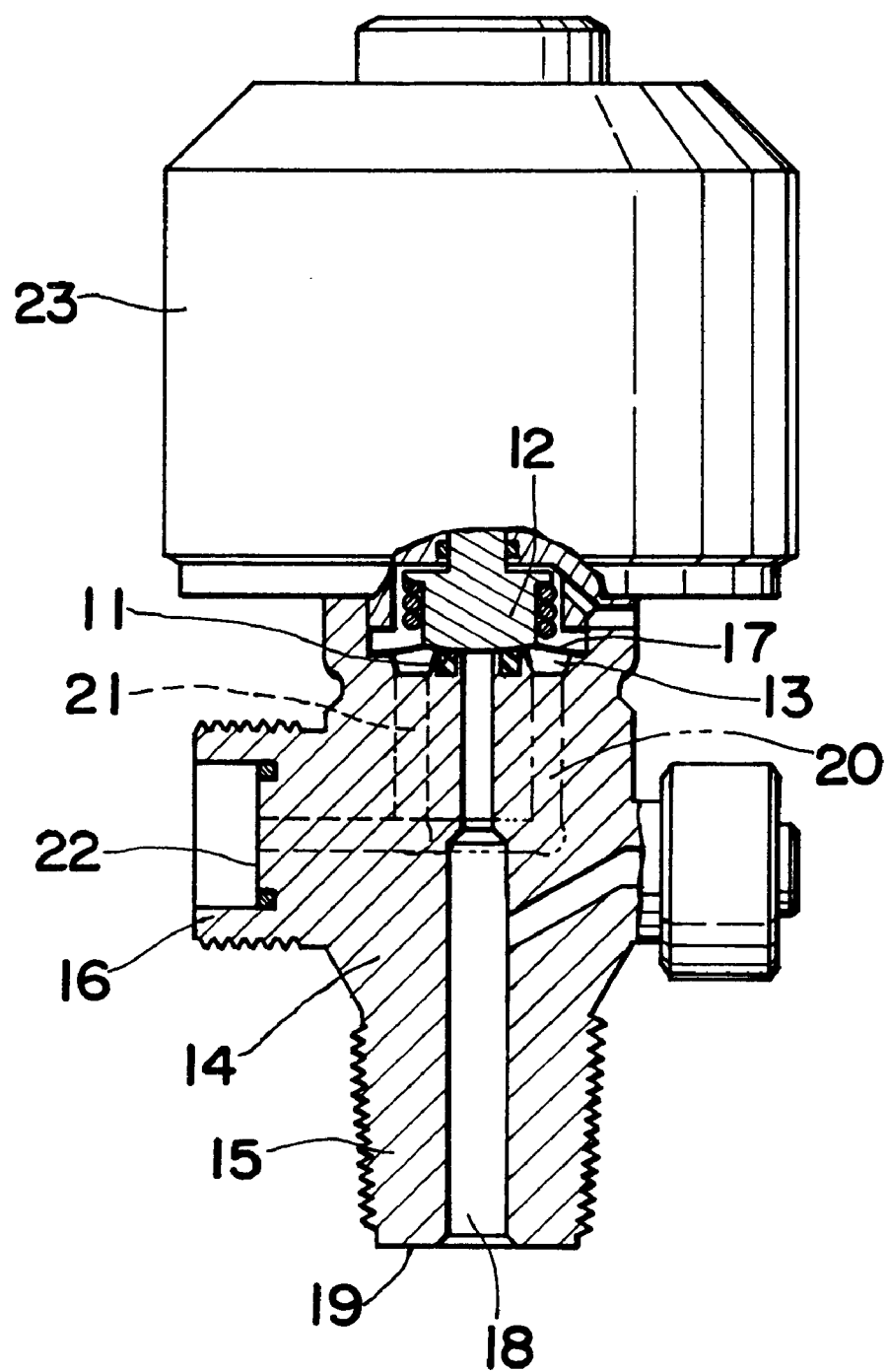
FIG. 3 is a partly cross-sectional front view of the gas cylinder valve showing the state where the metal connector is detached.
Figure 4:
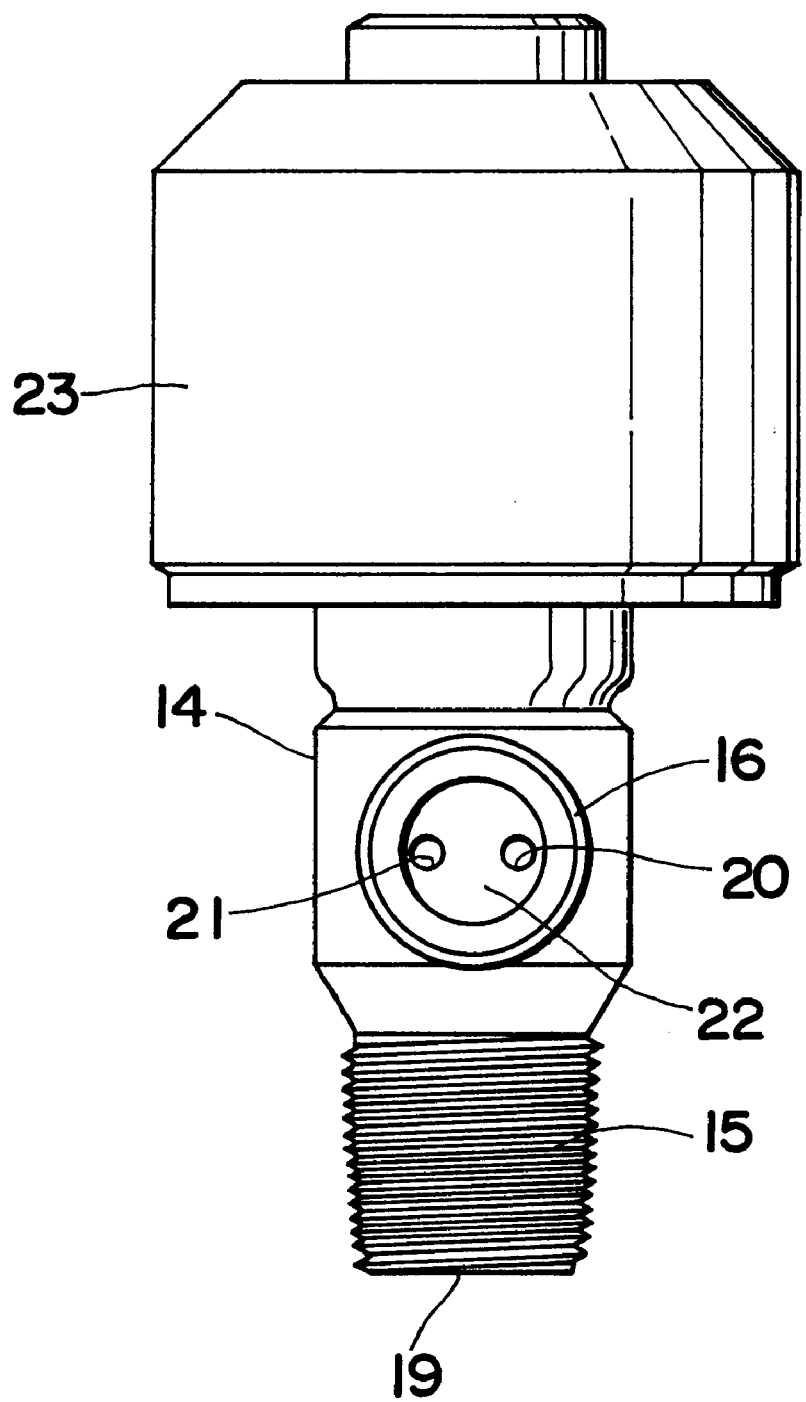
FIG. 4 is a side view of the gas cylinder valve in the same state as in FIG. 3.

The bottom of the valve chamber 13 is formed concentrically with respect to the valve chamber opening 24 of the upstream side gas channel 18 so as to surround the valve seat 11. Valve chamber openings 25 and 26 of the downstream side gas channels 20 and 21 are located to oppose each other across the valve seat 11, for example, as shown in FIG. 2, so that they are spaced away from each other as far as possible. That is, the valve chamber openings 25 and 26 are positioned such that the amount of the gas flowing from one downstream side gas channel into the valve chamber 13 is equilibrium with the amount of gas flowing therefrom into the other downstream side gas channel.

Meanwhile, the downstream side gas channel 20 to which the valve chamber opening 25 opens at a position apart from the end 22 of the port 16 is formed to be as close to the center of the valve body 14 so long as it does not affect the upstream side gas channel 18, and thus the distance between these two downstream side gas channels 20 and 21 can be minimized. This facilitates formation of these channels 20 and 21 in the port 16 having the same bore diameter as in conventional ports.

A metal connector 29 containing two connecting channels 27 and 28 to be connected to the downstream side gas channels 20 and 21 respectively is fitted to the end 22 of the port 16. This metal connector 29, like the ordinary metal connector of the prior art, is fastened to the port 16 by a cap nut 30 to be screwed onto an external thread formed on the circumference of the port 16, and a sealing material 31 for preventing external leakage is applied to the joint with the port 16.

While various kinds of fitting pipes of gas producing plants, gas supply plants, etc. are connected to the connecting channels 27 and 28, a piping system having a purge gas introducing system and a piping system having a purge gas bleeding system are connected to one connecting channel and to the other connecting channel respectively, at the time of purging.

The gas cylinder valve 10 and the metal connector 29 are produced by forging brass, stainless steel, nickel alloy, etc., followed by machining, like those of the prior art, and they are subjected on the gas contact surfaces, for example, to mechanical polishing, abrasive polishing, electrolytic polishing, composite electrolytic polishing, chemical polishing or composite chemical polishing so as to minimize the influence of adsorption of gas molecules such as of water and particles onto such surfaces and to improve corrosion resistance of the metal surface.

Further, the diaphragm 17 is usually formed by stainless steel or nickel-based alloy and is operated to be open and closed by the opening and closing mechanism 23. As the opening and closing mechanism 23, there may be employed a suitable one selected from various kinds of mechanisms employed conventionally in such type of gas cylinder valves, for example, the pneumatic operation type utilizing compressed air, the electric type rotating a screw rod by a motor and the manual type operating a handle manually. Meanwhile, for the valve seat 11, various kinds of polymer materials including fluororesins (e.g., Teflon and Daiflon, trade name) and polyimides are generally used. Further, there may also be employed the all-metal valve structure having a gas cylinder valve body and a valve seat integrated into one structure in view of water removing efficiency.

Each channel desirably has a large bore diameter so as to prevent reduction in the conductance from occurring during evacuation, and is suitably 2 to 6 mm usually. On the same ground, each channel is desirably as short as possible, and the height of the valve chamber 13 (the distance between the bottom of the valve chamber and the diaphragm) is desirably 3 mm or less.

It should be noted here that the gas cylinder valve 10 can be attached to a gas cylinder in the same manner as in the prior art, and that fitting pipes can be connected to the connecting channels 27 and 28 in the same manner as in the conventional connecting pipes, so that detailed description and illustration of them will be omitted.

The metal connector 29 may be attached normally to the gas cylinder valve 10, and the connecting channels 27 and 28 may be connected to fitting pipes respectively, when the gas contained in the gas cylinder is to be used. However, it is preferred to connect the metal connector 29 to predetermined fitting pipes of a gas producing plant or a gas supply plant and to connect normally the metal connector 29 to the port 16 of the gas cylinder valve 10 to achieve connection between the valve 10 with each pipe when the gas in a gas cylinder is to be used. Further, guides for achieving ridge and recess engagement may be formed on the port 16 and on the metal connector 29 respectively so as to secure orientation of the latter against the former.

When the gas cylinder valve 10 having the structure as described above is connected to fitting pipes of a gas supply plant or the like, the atmospheric air migrates into the valve chamber 13, downstream side gas channels 20 and 21, connecting channels 27 and 28 and such fitting pipes of the gas supply plant or the like. However, the thus migrated atmospheric air components can be purged efficiently and securely by connecting a purge gas introducing system and a purge gas bleeding system to one connecting channel and to the other connecting channel respectively.

That is, in the case where a purge gas is supplied to one connecting channel 27 and is bled from the other connecting channel 28, the purge gas flowed into the connecting channel 27 flows further through the downstream side gas channel 20 into the valve chamber 13 and is divided into two streams which flow half round the valve chamber 13 respectively, and they are bled together from the downstream side gas channel 21 and through the connecting channel 28. Here, since the valve chamber openings 25 and 26 are located to oppose each other as described above, uniformity can be achieved in the flow rate and flow velocity of the purge gas flowing in the valve chamber 13, enabling efficient and effective purging.

As described above, since the purge gas flows in the valve chamber 13 and each channel in the same direction, and besides the dead space (dwelling of gas) in the gas channel can be minimized, the gas replacement characteristics can be improved on a great margin, and the migrated atmospheric air components can be removed quickly by carrying out flow-through purging in which a purge gas is allowed to flow continuously. The atmospheric air components can also be removed by repeating batchwise purging where the inside of the system is pressurized with the purge gas, followed by evacuation of the system to provide a pressure lower than the atmospheric pressure. Generally, this batchwise purging is preferably repeated at least 10 times, and the larger the number of runs, the higher becomes the feasibility of purging.

This gas cylinder valve can be manufactured to have the same dimensions as in the conventional gas cylinder valve having a single-ported structure, so that it can be applied readily to existing equipment. Accordingly, there occurs almost no extra cost in the gas plant side when the gas cylinder valve 10 is used.

The purge gas employable in the semiconductor manufacturing process include generally nitrogen, argon, helium and hydrogen, and there are preferably employed those purge gases of such a purity as has a water content of 0.1 ppm or less, an oxygen content of 0.1 ppm or less and 100 particles (diameter: 0.3 $\mu$m)/cf (cf: cubic foot ($ft^3$), particularly a water content of 0.01 ppm or less, an oxygen content of 0.01 ppm or less and 10 particles/cf.

The valve chamber openings 25 and 26 of the respective downstream side gas channels 20 and 21 can be positioned suitably depending on the shape of the valve chamber 13 and the like. For example, in the case where the valve chamber 13 has a U-form, the valve chamber openings 25 and 26 may be defined at the extremities of the chamber 13 respectively.

TEST EXAMPLE 1

A diaphragm gas cylinder valve 10 and a metal connector 29, having the structures as shown in FIG. 1, were fabricated. A valve body 14 was obtained by subjecting a forged product of SUS 316L stainless steel material to machining, and a diaphragm 17 was made using a Ni-based alloy. Gas contact surfaces of the valve 10, connector 29 and diaphragm 17 were subjected to composite chemical polishing. Further, Daiflon (trade name) was used to form a valve seat 11. Each channel was formed to have a diameter of 3 mm.

Figure 5:
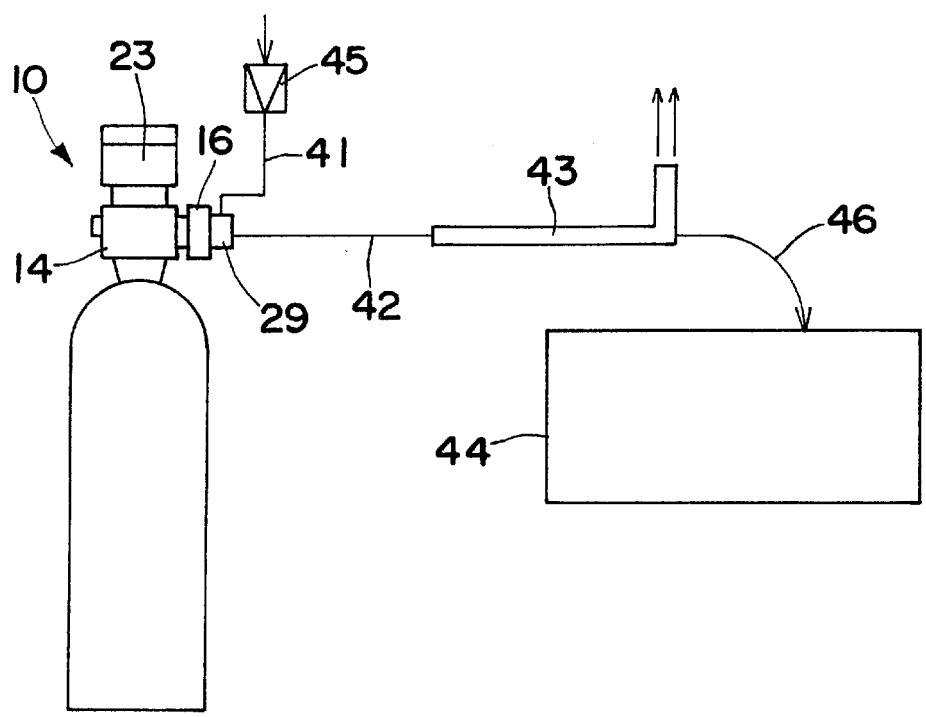
FIG. 5 is a system diagram showing the state of connection of equipments used in Test Example 1.

As shown in FIG. 5, a high-purity nitrogen introducing pipe 41 and a bleeding pipe 42 were connected to one connecting channel and the other connecting channel of the metal connector 29 attached to the port 16 of the gas cylinder valve 10, and a laser particle counter 44 was connected to the bleeding pipe 42 via an isokinetic sampler 43.

Nitrogen gas from which particles having a diameter of 0.1 $\mu$m or more were removed to a concentration of 1 particle/cf using a stainless steel all-metal filter 45 was introduced through the high-purity nitrogen gas introducing pipe 41 to the gas cylinder valve 10 at a rate of 100 l/min; while the gas bled from the valve 10 into the bleeding pipe 42 was introduced to the isokinetic sampler 43 and was diverted to a pipe 46 at a rate of 2.8 ml/min. The gas diverted to the pipe 46 was introduced to the laser particle counter 44 so as to count the number of particles having a diameter of 0.05 $\mu$m or more.

Meanwhile, as comparative examples, an ordinary single-ported gas cylinder valve and a double-ported gas cylinder valve were provided. For the single-ported gas cylinder valve, the above test was repeated analogously using a general metal connector conventionally employed. For the double-ported gas cylinder valve, the nitrogen gas was introduced through a purge port valve and bled through a sample gas outlet.

Figure 6:
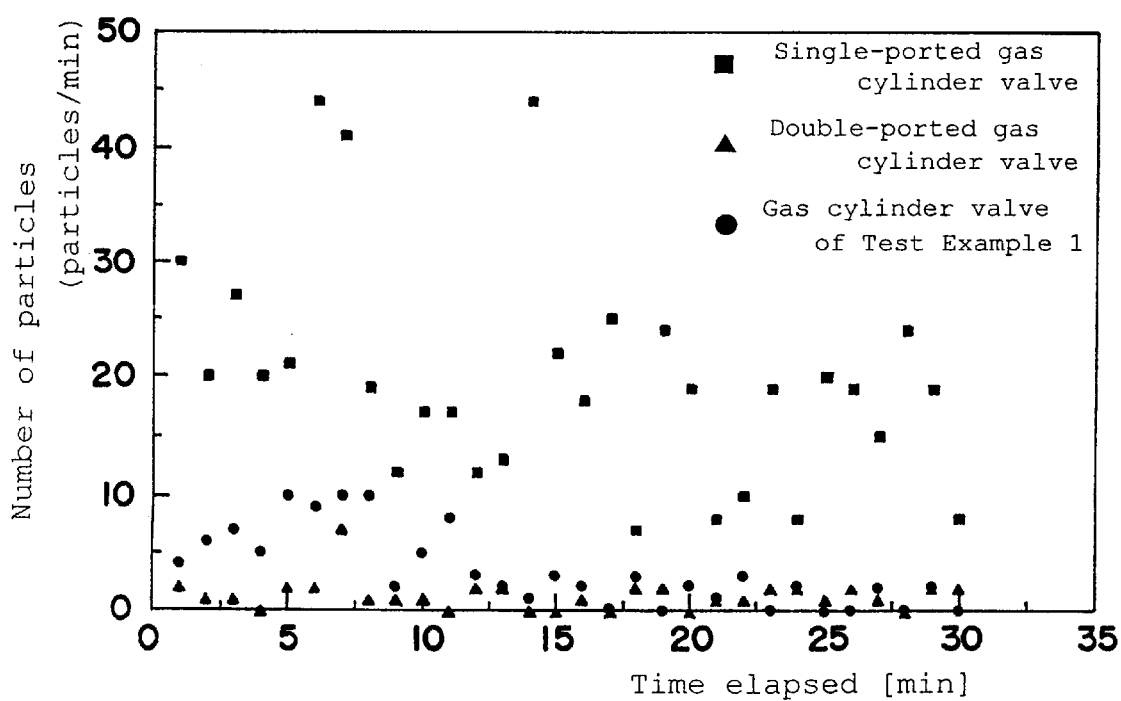
FIG. 6 is a graph showing change in the number of particles with time.

The result of each measurement is shown in FIG. 6. As clearly shown in FIG. 6, it was confirmed that the gas cylinder valve of this embodiment can remove particles more quickly than in the conventional single-ported gas cylinder valve and that its particle removing rate is almost equal to that of the double-ported gas cylinder valve.

EXAMPLE 2

Figure 7:
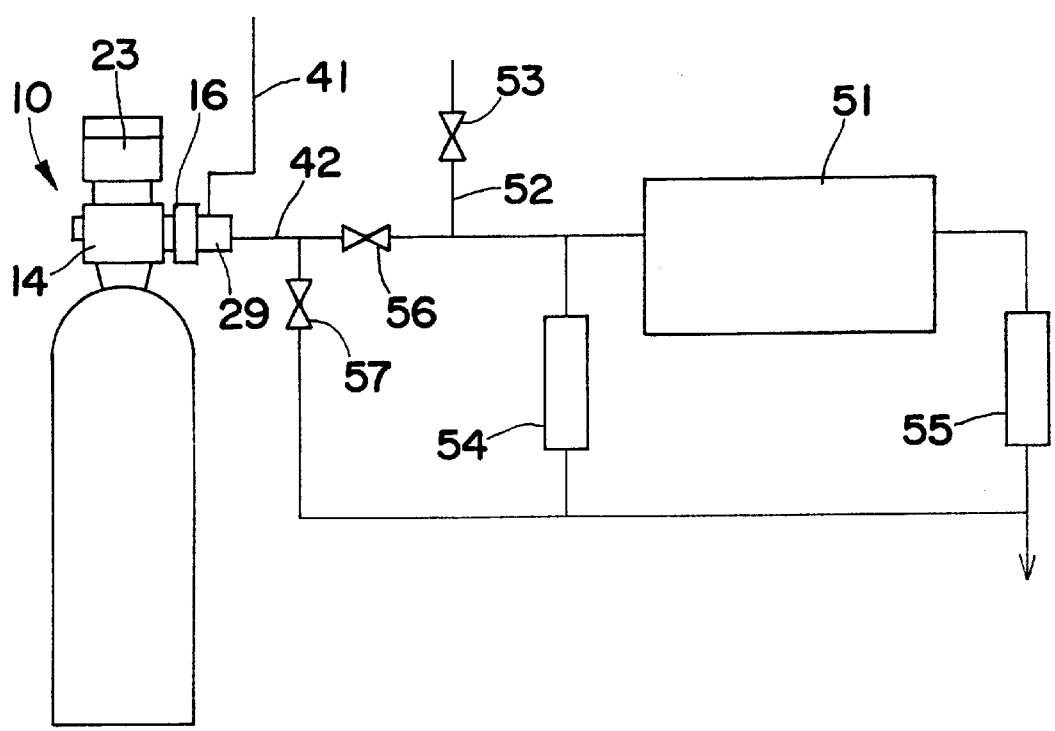
FIG. 7 is a system diagram showing the state of connection of equipments used in Test Example 2.

As shown in FIG. 7, an atmospheric pressure ionization mass spectrometer (hereinafter abbreviated as API-MS) 51 was connected to the downstream part of the bleeding pipe 42 to determine purge characteristics by measuring the water content in the bleed gas. Incidentally, the bleeding pipe 42 is provided with a pipe 52 and a valve 53 for introducing a purge gas for the API-MS 51; and mass flow controllers 54 and 55 and selector valves 56 and 57 for maintaining the gas flow rate in the API-MS 51 at a constant level.

In this embodiment, purging operation was carried out based on the actual operation of replacing the gas cylinder. More specifically, the high-purity nitrogen introducing pipe 41 and the bleeding pipe 42 were connected beforehand to the metal connector 29, and in this state the metal connector 29 was detached and attached against the port 16 of the gas cylinder valve 10 in replacement of the gas cylinder. The metal connector 29 was fitted to the port 16 under feeding of a very small amount of high-purity nitrogen gas from the high-purity nitrogen gas introducing pipe 41.

After fitting of the metal connector 29 to the gas cylinder valve 10, the high-purity nitrogen gas (water content: $\leq 1$ ppb) was introduced from the high-purity nitrogen gas introducing pipe 41 into the valve 10 at a rate of 2 l/min, and the gas bled into the bleeding pipe 42 was introduced in a predetermined to the API-MS 51. The mass number of the contaminant was determined by API-MS 51 as M/Z=18 in terms of moisture. The above measurement was repeated for the single-ported gas cylinder valve and the double-ported gas cylinder valve.

Figure 8:
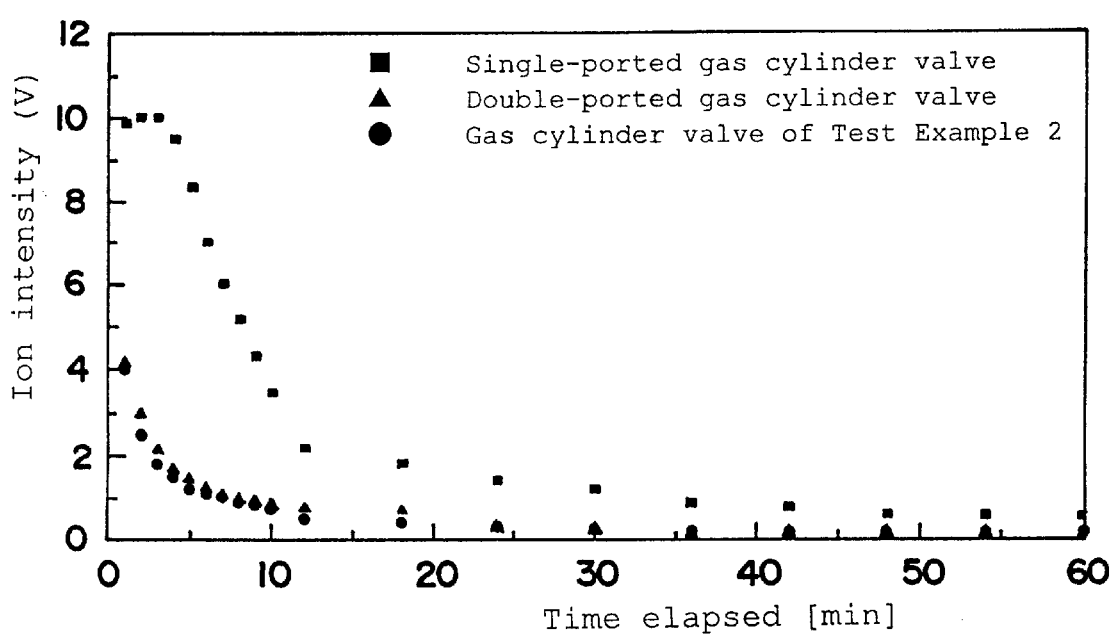
FIG. 8 is a graph showing change in the concentration of contaminant (water content) with time.

FIG. 8 shows changes in concentration (ion intensity) of the measured contaminant (moisture) with time. It was confirmed that in the gas cylinder valve of this embodiment and the double-ported gas cylinder valve, water content was removed more quickly than in the single-ported gas cylinder valve and that the contaminant removing rates were almost the same in the above two valves. That is, it can be appreciated that the gas cylinder valve of this embodiment has sufficient effect of removing the atmospheric air components migrated in the actual gas cylinder replacement.

What is claimed is:

1. A gas cylinder valve comprising a valve body having a valve chamber containing a valving element which opens and closes an annular valve seat, and a gas cylinder plugging end portion and a pipe-connecting port both formed on the valve body;

the gas cylinder plugging end portion containing an upstream side gas channel opening at one extremity to an end thereof and at the other extremity to an internal circumference of the valve seat; the port containing two downstream side gas channels each opening at one extremity to an end thereof and at the other extremity to an external circumference of the valve seat; a metal connector containing two channels to be connected to the two downstream side gas channels respectively being fitted in the port; one of two channels being connected to a purge gas charge side, while the other channel being connected to a purge gas bleed side.

2. The gas cylinder valve according to claim 1, wherein valve chamber openings of the two downstream side gas channels are positioned to be spaced farthest from each other in the valve chamber.

3. The gas cylinder valve according to claim 1, wherein the valve chamber is formed concentrically with respect to a valve chamber opening of the upstream side gas channel so as to surround the valve seat, while the valve chamber openings of the two downstream side gas channels are located to oppose each other across the valve seat.

* * * * *